US010360251B1

(12) United States Patent
Bairavasundaram et al.

(10) Patent No.: US 10,360,251 B1
(45) Date of Patent: Jul. 23, 2019

(54) EFFICIENT COMPRESSION OF SYSTEM LOGS THROUGH METADATA-BASED GROUPING

(75) Inventors: Lakshmi Narayanan Bairavasundaram, Sunnyvale, CA (US); Kaladhar Voruganti, San Jose, CA (US); Rukma A. Talwadker, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 976 days.

(21) Appl. No.: 12/613,123

(22) Filed: Nov. 5, 2009

(51) Int. Cl.
*G06F 16/35* (2019.01)

(52) U.S. Cl.
CPC .................................. *G06F 16/355* (2019.01)

(58) Field of Classification Search
CPC ......... G06F 17/30598; G06F 17/30705; G06F 9/542; G06F 16/355
USPC ............................ 711/161; 715/808; 707/688
See application file for complete search history.

(56) References Cited

U.S. PATENT DOCUMENTS

| | | | | |
|---|---|---|---|---|
| 5,321,837 A * | 6/1994 | Daniel | .................... | G06F 9/542 |
| 5,706,470 A * | 1/1998 | Okada | ........................... | 711/161 |
| 8,805,886 B1 * | 8/2014 | Kiselev | ............. | G06F 17/30377 707/793 |
| 2002/0059582 A1 * | 5/2002 | Niklasson | ....................... | 725/32 |
| 2004/0044693 A1 * | 3/2004 | Hadley | .................... | G06F 8/71 |
| 2005/0138483 A1 * | 6/2005 | Hatonen et al. | ................. | 714/45 |
| 2006/0184529 A1 * | 8/2006 | Berg | .................... | G06F 11/0709 |
| 2007/0156698 A1 * | 7/2007 | Gebhart et al. | .................. | 707/10 |
| 2009/0049016 A1 * | 2/2009 | Sakamoto | ......................... | 707/3 |
| 2009/0089252 A1 * | 4/2009 | Galitsky et al. | .................... | 707/3 |
| 2009/0234867 A1 * | 9/2009 | Miyazawa et al. | ........... | 707/100 |
| 2010/0082555 A1 * | 4/2010 | Ogawa et al. | ................ | 707/688 |
| 2011/0066973 A1 * | 3/2011 | Plom et al. | .................... | 715/808 |

OTHER PUBLICATIONS

Verbowski, et al., Flight Data Recorder: Monitoring Persistent-State Interactions to Improve Systems Management, Proceedings of the Symposium on Operating Systems Design and Implementation (ODSI 2006), 2006.

\* cited by examiner

*Primary Examiner* — Boris Gorney
*Assistant Examiner* — Christy Y Kim
(74) *Attorney, Agent, or Firm* — Cooper Legal Group, LLC

(57) ABSTRACT

A method and system for grouping and compressing system logs are described herein. A generation module residing and executing on a computer system may be configured to generate system logs containing system data important for support purposes describing the computer system, and system log metadata for describing the system logs. A grouping module residing and executing on a computer system may be configured to group system logs based on the system log metadata. Each group of system logs may comprise two or more system logs having the same or similar system log metadata. A data container is produced for each group of system logs and the data container is compressed. System logs having the same or similar system log metadata are more likely to have similar data, thus resulting in a higher degree of compression when grouped and compressed together.

15 Claims, 8 Drawing Sheets

EFFICIENT COMPRESSION OF SYSTEM LOGS THROUGH METADATA-BASED GROUPING

FIELD OF THE INVENTION

The present invention relates to computer systems and, more specifically, to efficient compression of system logs through metadata-based grouping.

BACKGROUND

A storage system environment may include one or more storage systems (for storing server data on storage devices) and multiple server systems accessing each storage system. Each storage system includes a storage operating system that implements a file system to logically organize the information as a hierarchical structure of directories and files on the storage devices. Each file may comprise a set of data blocks, whereas each directory may be implemented as a specially-formatted file in which information about other files and directories are stored.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

To provide support capabilities, a server or storage system may periodically produce and store logs/files of system events ("system logs/files"). A server or storage system may also collect and store (to the system logs) particular system information that is important for support purposes, such as maintenance or debugging/correcting errors of the server or storage system. For example, a system log may contain a list of important system activities/events, system configuration information, and system performance data. The system logs may then be analyzed/processed by administrators or program applications (e.g., debuggers) for providing support to the server or storage system (e.g., for maintenance or debugging).

In a storage system environment, the system logs generated by multiple server and storage systems may also be transferred and stored to a central storage location ("central repository"). For example, each server system may transmit its system logs to a particular storage system that acts as the central repository. The system logs of the server and storage systems may then be stored and further analyzed/processed at the central location for providing support to the server and storage systems and for detecting support issues across multiple server and storage systems.

Typically, however, the amount of storage space needed to store the system logs may consume significant storage resources. The use of storage resources may also be compounded by increasing number of server or storage systems used in the storage system environment, increasing quantities of system events, configuration, and performance data stored to a system log needed for providing effective support, and the long periods of time the system logs may be kept.

Data compression techniques may be implemented to reduce the storage space required by the system logs. Although data compression may reduce the storage size of a file, compression may also increase the access time to the file (since the file must first be decompressed). Compression may be appropriate for system logs, however, since each individual system log is typically rarely accessed and the increase in access time may be justified by the storage space savings. For example, the system logs are typically compressed individually. However, such compression may not provide sufficient storage savings since compression techniques typically produce greater compression ratios when a file has many repeating elements, and an individual system log/file may not contain enough repeating elements to produce a high compression ratio. The ratio or degree of compression is typically determined by comparing the original data size and the compressed data size, a higher ratio or degree of compression indicating a lower compressed data size given the same original data size.

System logs may also be grouped and then compressed as a group. However, system logs are typically grouped together arbitrarily (e.g., grouping random system logs, grouping system logs in order received, etc.). Since the system logs are grouped arbitrarily, the degree of compression may still not provide sufficient storage savings since the arbitrary grouping of system logs may still not contain enough repeating elements to produce a high compression ratio. As such, there is a need for a method for compressing system logs in a more efficient manner.

SUMMARY

A method and system for grouping and compressing system logs using metadata are described herein. In some embodiments, when a system log is generated, system log metadata describing the system log is also generated and stored to the system log. System logs having the same or similar system log metadata are then grouped and compressed together. System logs having the same or similar system log metadata are more likely to have similar data, thus resulting in a higher degree of compression when grouped together.

A system log generation module residing and executing on a computer system may be configured to produce system logs of the computer system. The system log generation module may, at various times, collect particular system data regarding the computer system and store the collected system data to system logs. System data may describe particular elements of a computer system and are relevant for support purposes, such as data regarding particular system events, system configuration information, system performance data, etc.

In some embodiments, for each system log, the system log generation module is further configured for producing and storing system log metadata to the system log. The system log metadata may include metadata relevant for grouping and compressing the system logs, such as "indicative metadata" that is indicative/predictive of the similarity of system data in the system logs. In these embodiments, the system log metadata may include data describing the system log itself and/or a predetermined sub-set of the system data (listed in the system log) that is relevant for more efficiently grouping and compressing the system logs. For example, the system log metadata may include metadata fields for the time the system log was generated, any prominent system events listed in the system log, any prominent system configuration information listed in the system log, etc. The metadata fields may be stored in each system log in a predetermined order so that corresponding metadata fields in different system logs may be compared.

In some embodiments, a system log grouping module residing and executing on a computer system may be configured to group system logs based on the system log metadata of the system logs. Each group of system logs may comprise two or more system logs having the same or similar system log metadata. For example, the system log grouping module may compare one or more metadata fields in the system logs and group together those system logs having the same or similar values for one or more metadata fields. Which values are similar for particular metadata fields may be determined using a metadata similarity data structure that specifies values considered similar for particular metadata fields.

The system log grouping module may then produce a single data container for each group of system logs for storing the data for each system log in the group. The system log grouping module then compresses each data container (e.g., using a compression window size that is at least as large as an individual system log). The compressed data container is then stored. Note that the compressed data container will typically contain a significantly higher degree of compression than if grouping system logs arbitrarily for compression. As such, the storage resources required for storing the system logs may be significantly reduced. Thus, useful system log data may be retained for longer periods of time (by delaying deletion of system logs for recovering storage space).

In some embodiments, at least two computer systems may be connected through a network, each computer system producing its own system logs. In these embodiments, the system logs of a computer system may be transmitted and stored to a central storage location ("central repository"). In these embodiments, one of the computer systems may act as the central repository and process the system logs of the two or more computer systems using methods described herein.

DETAILED DESCRIPTION

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I describes a storage system environment in which some embodiments operate. Section II describes generating system logs having system log metadata. Section III describes grouping and compressing system logs based on the system log metadata.

I. Storage System Environment

Figure 1:
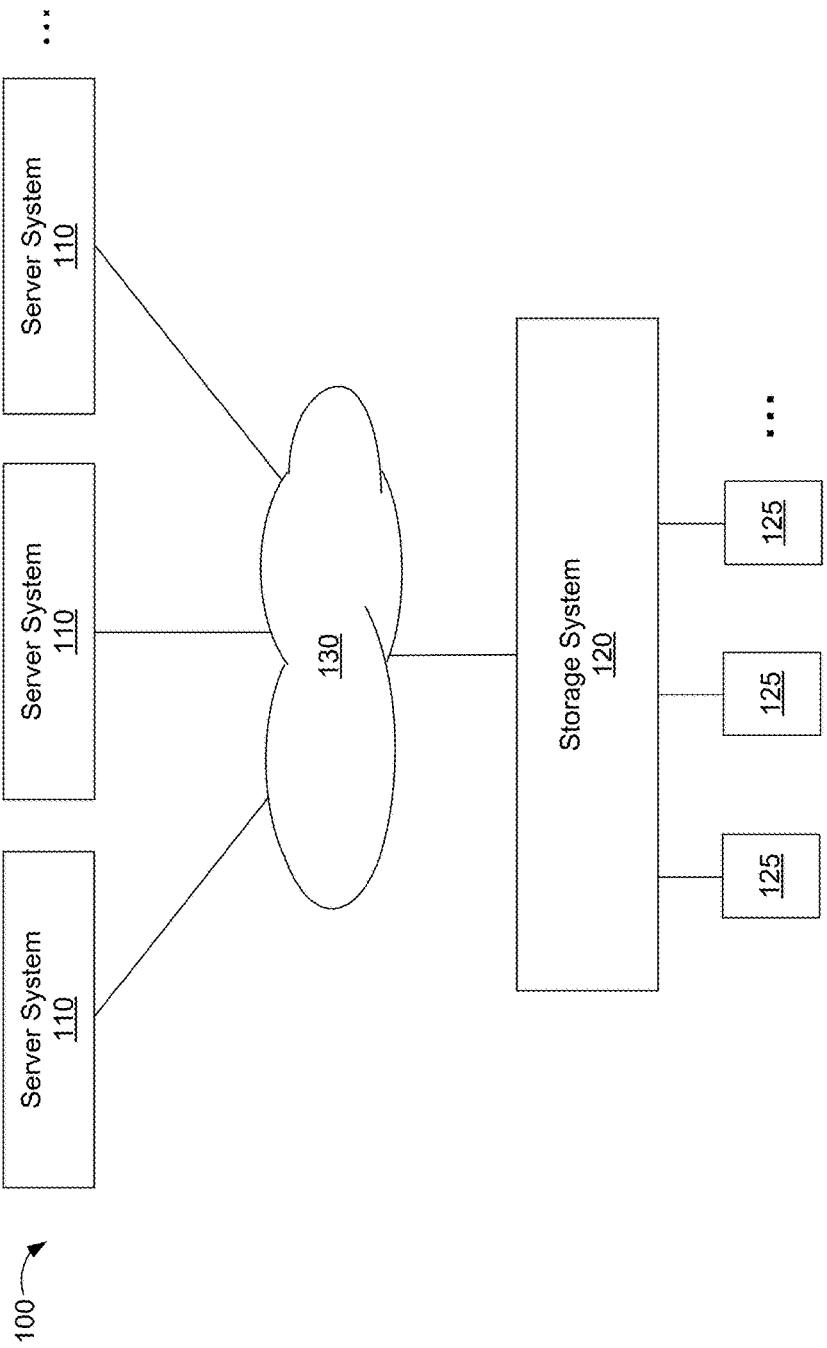
FIG. 1 is a schematic block diagram of an exemplary storage system environment in which some embodiments operate.

FIG. 1 is a schematic block diagram of an exemplary storage system environment 100 in which some embodiments operate. The environment 100 comprises one or more server systems 110 and a storage system 120 (comprising a set of one or more storage devices 125) that are connected via a connection system 130. The connection system 130 may comprise a network, such as a Local Area Network (LAN), Wide Area Network (WAN), metropolitan area network (MAN), virtual private networks implemented over a public network (Internet), point-to-point links, or any other type of network or communication system between computer systems.

A server system 110 may comprise a computer system that utilizes services of the storage system 120 to store and manage data in the storage devices 125 of the storage system 120. A server system 110 may execute one or more applications that submit read/write requests for reading/writing data on the storage devices 125 of the storage system 120. Interaction between a server system 110 and the storage system 120 can enable the provision of storage services. That is, server system 110 may request the services of the storage system 120 (e.g., through read or write requests), and the storage system 120 may perform the requests and return responses for the services requested by the server system 110 (by exchanging packets over the connection system 130).

The server system 110 may issue access requests (e.g., read or write requests) by issuing packets using file-based access protocols, such as the Common Internet File System (CIFS) protocol or Network File System (NFS) protocol, over the Transmission Control Protocol/Internet Protocol (TCP/IP) when accessing data in the form of files and directories. Alternatively, the server system 110 may issue access requests by issuing packets using block-based access protocols, such as the Fibre Channel Protocol (FCP), or Internet Small Computer System Interface (iSCSI) Storage Area Network (SAN) access, when accessing data in the form of blocks.

The storage system 120 may comprise a computer system that stores data in a set of one or more storage devices 125. A storage device 125 may comprise a writable storage device media, such as disk devices, video tape, optical, DVD, magnetic tape, flash memory, Magnetic Random Access Memory (MRAM), Phase Change RAM (PRAM), and any other similar device or media adapted to store information (including data and parity information). The storage system 120 may implement a file system to logically organize the data as a hierarchical structure of directories and files on the storage devices 125. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125.

Figure 2:
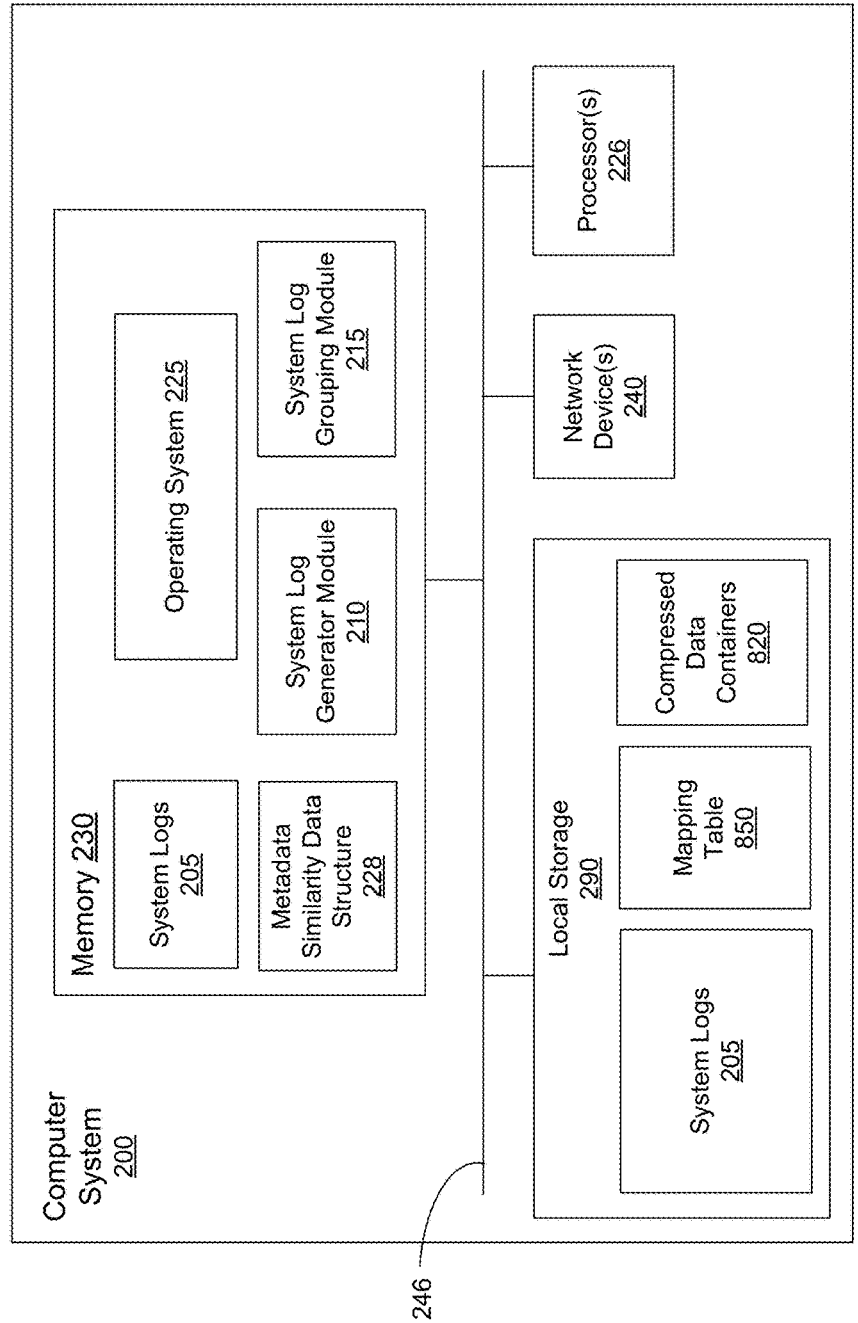
FIG. 2 is a schematic block diagram of an exemplary computer system that may be employed in the storage system environment of FIG. 1.

FIG. 2 is a schematic block diagram of an exemplary computer system 200 that may be employed in the storage system environment of FIG. 1. The server system 110, and/or storage system 120 of FIG. 1 may be implemented as the computer system 200. Those skilled in the art will understand that the embodiments described herein may apply to any type of computer system, such as a special-purpose computer (e.g., storage system) or general-purpose computer, including a standalone computer, embodied or not embodied as a storage system.

The computer system 200 comprises processor(s) 226, memory 230, one or more network devices/adapters 240, and a local storage 290 coupled by a bus 246. The processors 226 comprise the central processing units (CPUs) of the computer system 200 and control the overall operation of the computer system 200. In certain embodiments, the processors 226 accomplish this by executing software, such as software described below. The processors 226 may include one or more programmable general-purpose or special-purpose microprocessors, digital signal processors (DSPs), programmable controllers, application specific integrated circuits (ASICs), programmable logic devices (PLDs), or the like, and/or a combination of such devices.

The memory 230 comprises storage locations that are addressable by the processor 226 and adapters, such as a network device/adapter 240. The memory 230 may be a random access memory (RAM), a read-only memory (ROM), non-volatile random access memory (NVRAM), or the like, or a combination of such devices. It will be apparent to those skilled in the art that other processing and memory means, including various computer readable media, may be used for storing and executing program instructions pertaining to embodiments described herein. The memory 230 may store software program code such as an operating system 225. The operating system 225 can be, for example, a storage operating system (e.g., Data ONTAP®), a general-purpose operating system (e.g., UNIX®, Windows®, Linux®), or another type of operating system. The operating system 225 is discussed further in relation to FIG. 3.

A network device 240 may comprise mechanical, electrical and signaling circuitry needed to connect the computer system 200 to a network 130 and to receive and transmit data over the network 130. The network device 240 may comprise a network interface controller (e.g., Ethernet cards), network adapter, or any other physical device that controls the receiving and transmitting of data over a network. A network device 240 may provide one or more data access ports for coupling the computer system 200 to one or more other computer systems through a network. A connection and session with an external computer system may be established using a data access port of the network device 240 to receive data. Via the network, the network device 240 may receive data in the form of data packets formatted to allow proper transport over the network according to a particular communication protocol format (such as iSCSI Protocol, Transport Control Protocol (TCP), Internet Protocol (IP), etc.).

The processor 226 and the network devices 240 may comprise processing elements and/or logic circuitry configured to execute the software code stored in memory 230 and manipulate various addressable storage locations (such as in data structures and/or data buffers) in memory 230. The local storage 290 may comprise a storage device (e.g., disk device, solid state device, etc.) that stores software instructions and data within the computer system 200, such as the operating system 225, and associated data. The computer system 200 loads the software and data into the memory 230 from which they are accessed by the processors 226.

As shown in FIG. 2, the memory 230 may also store a plurality of system logs 205, a system log generation engine/module 210, a system log grouping engine/module 215, and a metadata similarity data structure 228. The system logs 205 may also be stored to the local storage 290. In other embodiments, the system logs 205 may be stored outside the local storage of the "central repository" on an external storage device (e.g., stored on a network storage device), whereby the computer system 200 manages and processes the system logs 205 on the external storage device in accordance with embodiments described herein.

To provide support capabilities (e.g., for maintenance or debugging), the system log generation module 210 may be configured to produce system logs 205 of the computer system 200. The system log generation module 210 may do so by collecting and storing, at various time points, particular system data regarding the computer system 200 (that is important for support purposes) to system logs 205. At a given time point, the system log generation module 210 may collect and store the system data that is current to the given time point to a particular system log 205. The system logs 205 may then be analyzed/processed by administrators or program applications (e.g., debuggers) for providing support to the server or storage system (e.g., for maintenance or debugging).

A system log 205 may comprise a data structure for storing system data (e.g., file, table, database, or other data container). The system log 205 may store system data important for support purposes, such as data regarding particular system events, particular system configuration information, particular system performance data, etc. As such, system log 205 comprises particular system data describing the computer system 200 on which the system log 205 is generated.

In some embodiments, for each system log 205, the system log generation module 210 is further configured for producing system log metadata for describing the system log 205 itself, and storing the produced system log metadata to the system log 205 (discussed below in Section II). In these embodiments, the system log grouping module 215 may be configured to group and compress system logs 205 based on the system log metadata of the system logs 205 (discussed below in Section III). The system log grouping module 215 may group and compress system logs 205 using the metadata similarity data structure 228.

In some embodiments, the computer system 200 is connected to a network. As known in the art, the computer system 200 may have an assigned IP address (as is assigned for each computer device connected to an IP network (TCP/IP network)). In some embodiments, at least two computer systems 200 may be connected through a network, each computer system 200 producing its own system logs 205. In these embodiments, the system logs 205 of the multiple computer systems 200 may be stored to a central storage location ("central repository"). For example, one or more computer systems 200 may each transmit its system logs 205 over a network to a particular computer system 200 that stores the received system logs 205 and its own system logs 205 to its local storage 290 (which acts as the central repository). For example, in FIG. 1, each server system 110 may transmit its system logs over the connection system 130 to the storage system 120 that acts as the central repository. As such, the central repository may comprise system logs for at least two computer systems 200. The system logs of the computer systems 200 may then be stored and further analyzed/processed at the central location for providing support to the computer systems and for detecting support issues across multiple computer systems. In these embodiments, each computer system 200 may comprise a system log generation engine/module 210 for generating its system logs 205. However, only the computer system acting as the central repository may need to implement the system log grouping engine/module 215 to process the various system logs 205.

Figure 3:
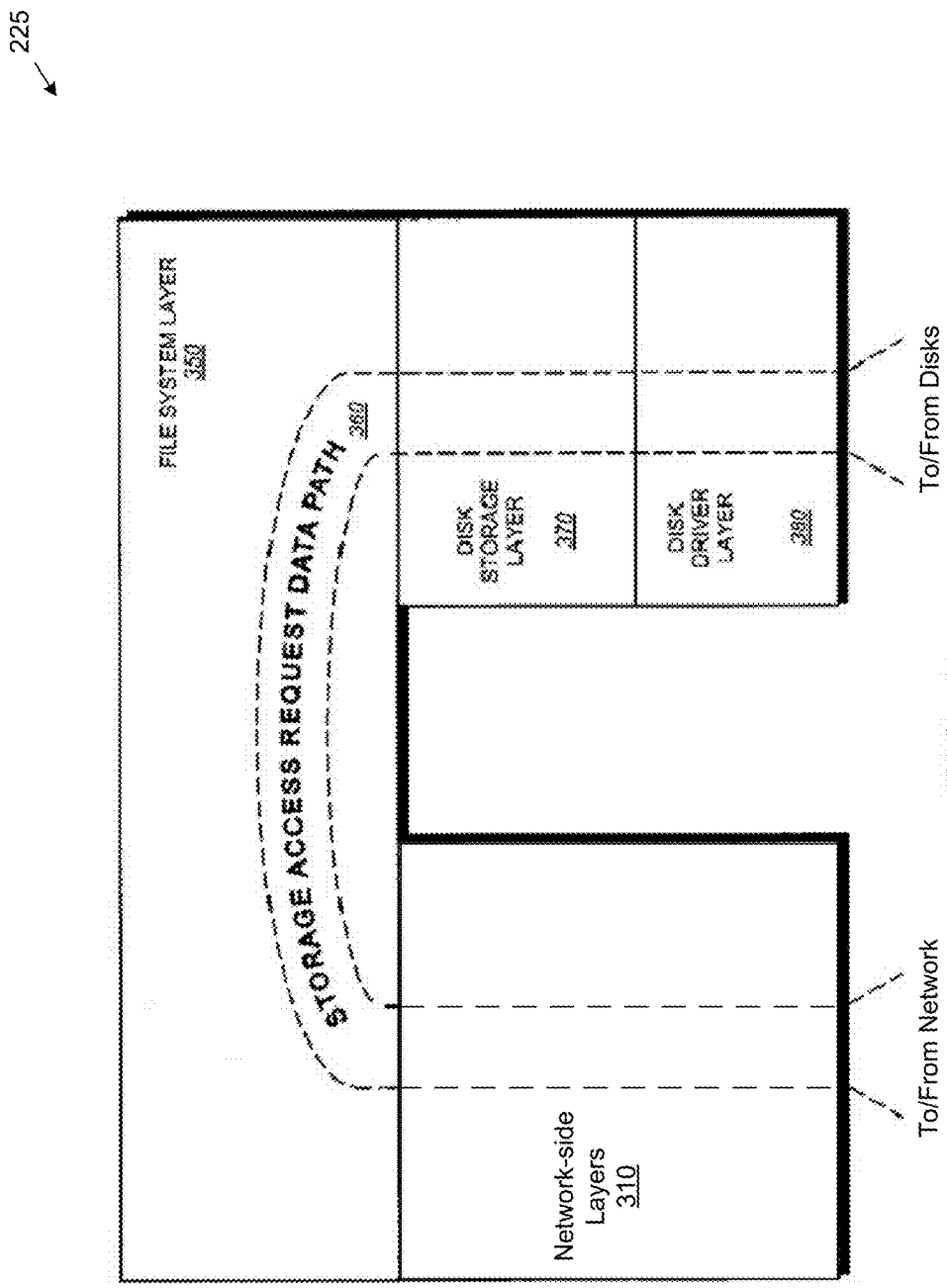
FIG. 3 is a conceptual diagram of various software layers of an operating system.

FIG. 3 is a conceptual diagram of various software layers of an operating system 225. In some embodiments, the operating system 225 comprises a microkernel operating system of a storage system 120. The software layers provide data paths 360 for servers 110 to access data stored on the storage system 120 using access protocols. The various software layers include network-side layers 310 and disk-side layers (including disk storage layer 370 and disk driver layer 380).

The operating system 225 implements the network-side layers 310 to interact with a server 110 by transmitting and receiving network data to and from the server 110. The received network data may comprise requests for data stored on a particular storage device 125 of the storage system 120 or requests to modify data on a storage device 125 along with the new data to be stored. The transmitted network data may comprise responses containing requested data or status information regarding a previous request received from the server system 110. Network-side layers 310 include layers that process network data according to particular protocols (e.g., Internet Protocol, Transport Control Protocol, iSCSI, etc.). The operating system 225 implements the disk-side layers to interact with the storage device 125 of the storage system 120. The operating system 225 manages the storage devices 125 using the disk storage layer 370 that implements a disk storage protocol (such as a RAID protocol) and the disk driver layer 380 that implements a disk control protocol (such as small computer system interface (SCSI), integrated drive electronics (IDE), etc.).

Bridging the network-side software layers 310 with the disk-side software layers is a file system layer 350 of the operating system 225. In an illustrative embodiment, the layer 350 implements a file system having an on-disk format representation that is block-based using, e.g., 4-kilobyte (KB) data blocks and using inodes to describe the files. An inode is a data structure used to store information about a file, such as ownership of the file, access permission for the file, size of the file, name of the file, location of the file, etc. In response to receiving a file access request, the file system generates operations to load (retrieve) the requested data from disks 125 if it is not resident in the storage system's memory. An external file handle in the server request typically identifies a file or directory requested by the server 110. Specifically, the file handle may specify a generation number, inode number and volume number corresponding to the server's requested data.

If the information is not resident in the storage system's memory, the file system layer 350 indexes into an inode file using the received inode number to access an appropriate entry and retrieve a logical volume block number. The file system layer 350 then passes the logical volume block number to the disk storage (RAID) layer 370, which maps that logical number to a disk block number and sends the latter to an appropriate driver of the disk driver layer 380. The disk driver 380 accesses the disk block number from disks 125 and loads the requested data in memory for processing by the storage system 120. Upon successful completion of the request, the storage system (and operating system) returns a response to the server 110 over the network.

It should be noted that the software "path" 360 through the operating system layers described above needed to perform data storage access for the server request received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server 110. Moreover, in a further embodiment, the processing elements of network and storage adapters may be configured to offload some or all of the packet processing and storage access operations, respectively, from processor to thereby increase the performance of the file service provided by the storage system.

II. Generating System Logs Having System Log Metadata

Figure 4:
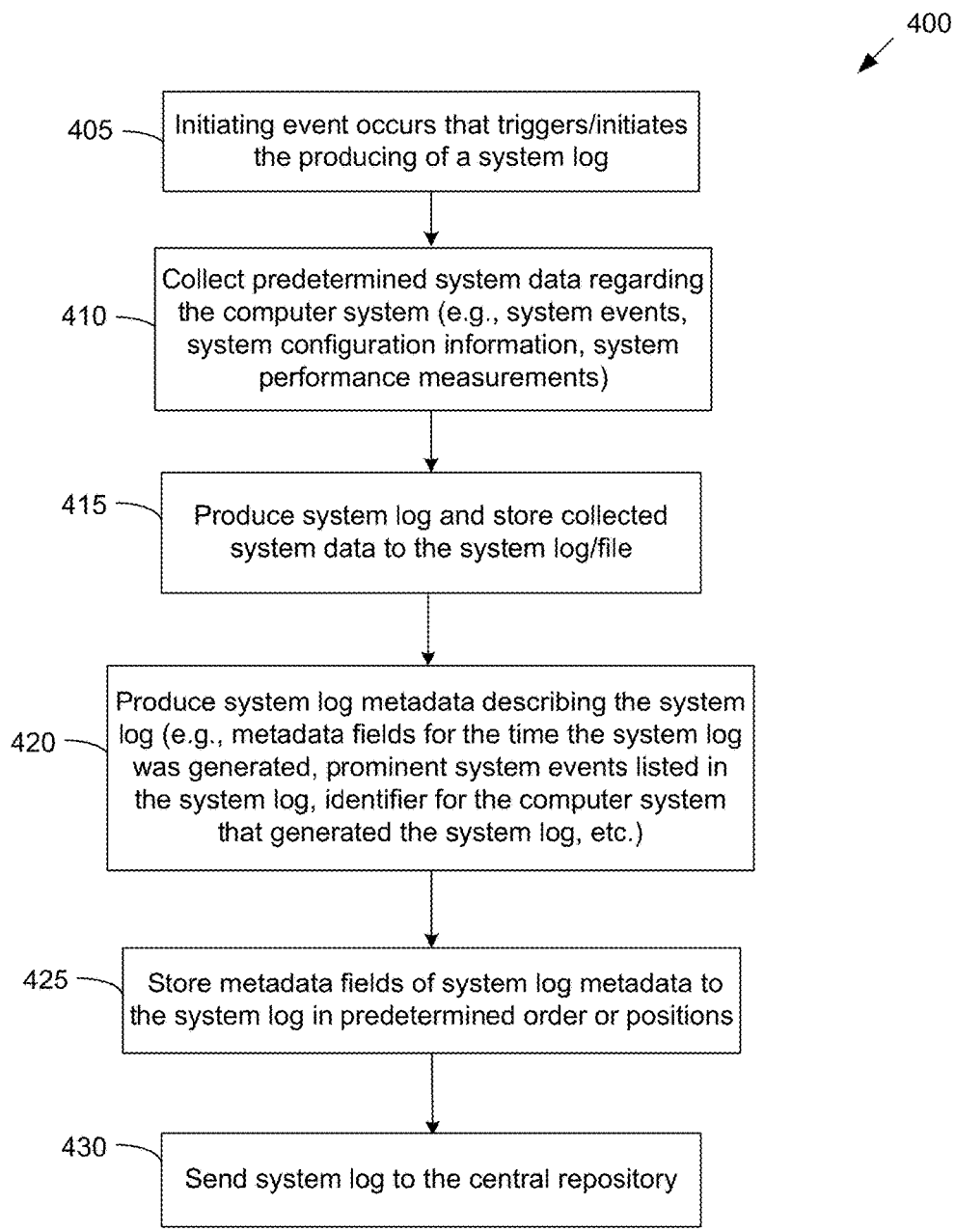
FIG. 4 is a flowchart of a method for generating system logs having system log metadata, in accordance with some embodiments.

FIG. 4 is a flowchart of a method 400 for generating system logs having system log metadata, in accordance with some embodiments. The method 400 of FIG. 4 is described in relation to FIG. 5. The order and number of steps of the method 400 are for illustrative purposes only and, in other embodiments, a different order and/or number of steps are used. For illustrative purposes, a system log is described below as a file. In other embodiments, however, the system log may comprise another type of data structure for storing system data (e.g., file, table, database, or other data container). In some embodiments, some of the steps of the method 400 are performed or caused to be performed by a system log generation module 210 executing on a computer system 200 (e.g., server 110 or storage system 120). The system log generation module 210 may operate in conjunction with the operating system 225 to perform embodiments described herein.

The method 400 begins when an initiating event occurs (at 405) that triggers/initiates the producing of a system log 205. For example, the system logs 205 of a computer system 200 may be produced periodically (at predetermined time intervals), upon occurrence of predetermined system events (such as system errors), etc. As such, the initiating event may comprise the expiration of the predetermined time interval or the occurrence of a predetermined system event. In other embodiments, the method 400 is initiated for other reasons (e.g., by administrative command, etc.).

Figure 5:
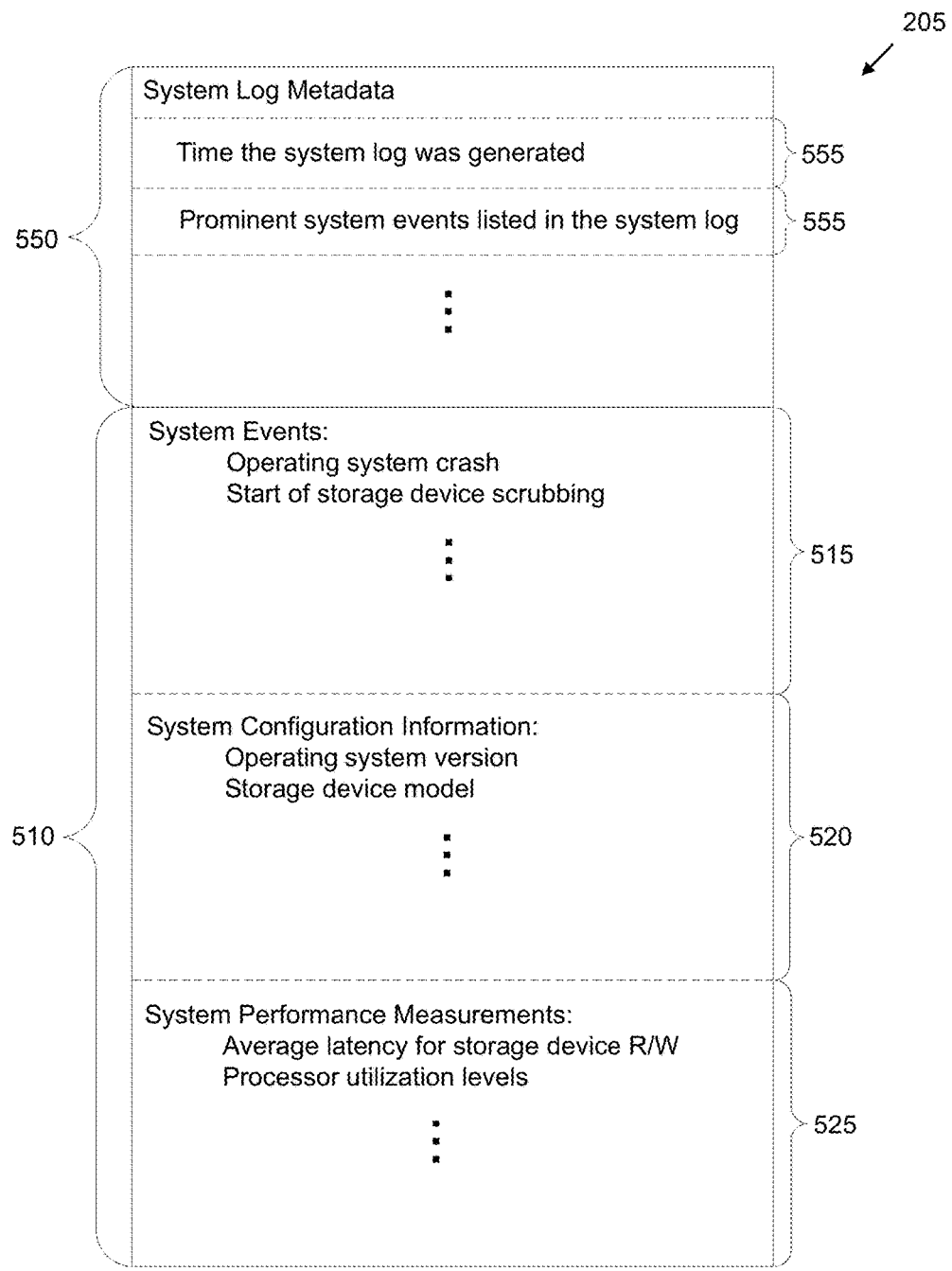
FIG. 5 conceptually illustrates the contents of an exemplary system log having system log metadata.

The method 400 then collects (at 410) system data describing particular elements of the computer system 200 and are relevant for support purposes. For example, the method may collect system data describing system events, system configuration information, and/or system performance of the computer system 200. The method 400 then produces (at 415) a system log 205 and stores the collected system data to the system log 205 (e.g., comprising a system log file). FIG. 5 conceptually illustrates the contents of an exemplary system log 205 having system log metadata. As shown in example of FIG. 5, the system log 205 comprises system data 510 including data describing particular system events 515, particular system configuration information 520, and particular system performance measurements 525.

For example, the system events 515 may include software application errors (e.g., operating system crash or panic and reboot, etc.), hardware component errors (e.g., storage device failure, network device failure, etc.), start and stop of software or hardware maintenance or debugging procedures (e.g., storage device scrubbing/erasure, storage device defragmentation, software updating, etc.), etc. In other embodiments, the system data 510 may include data describing other system events 515. For example, the system configuration information 520 may include software configuration information (e.g., operating system type and version, client application types and versions, etc.), hardware configuration information (e.g., processor model and version, disk-shelf firmware version, storage device model, serial number, bay number within a shelf it is located, whether it is a data device, parity device, or spare device, etc.). In other embodiments, the system data 510 may include other system configuration information 520. For example, the system performance measurements 525 may include software performance measurements (e.g., cache hit rate of file-system buffer caches, efficiency of data deduplication, number of accesses through each storage protocol, such as NFS, CIFS, etc.) or hardware performance measurements (e.g., average latency for storage device reads and writes, processor utilization levels, etc.). In other embodiments, the system data 510 may include other system performance measurements 525.

The method 400 then produces (at 420) system log metadata. As shown in FIG. 5, the system log 205 comprises one or more metadata fields 555 of system log metadata 550. For example, the system log metadata 550 may include metadata fields 555 for the time the system log 205 was generated, any "prominent" system events listed in the system log 205, any "prominent" system configuration information listed in the system log 205, an identifier for the computer system 200 that generated the system log 205 (e.g., host name and/or IP address), and/or an identifier of a customer site where the computer system 200 that generated the system log 205 resides (e.g., "Sacramento Data Center").

In other embodiments, the system log metadata 550 may comprise other metadata. In general, the system log metadata to be included in a system log may include system log metadata for improving the compression of system logs. For some types of system log metadata (referred to as "indicative metadata"), if the system log metadata of two system logs is the same or similar, this may indicate/predict that the system data in the two system logs are also the same or similar. Grouping and compressing system logs having the same or similar system data may typically provide a higher degree of compression. As such, grouping and compressing system logs based on indicative metadata may provide higher degrees of compression. Indicative metadata may be determined, for example, based on testing data showing which types of system log metadata better indicate/predict similarity of system data in the system logs. Indicative metadata may comprise those types of system log metadata that are more strongly indicative/predicative of the similarity of system data (compared to other types of system log metadata that are less indicative/predicative of the similarity of system data). In some embodiments, such indicative metadata is included in the system log metadata 550 of a system log 205.

The prominent system events may comprise a sub-set of the system events 515 included in the system data 510, whereby only a select few predetermined system events 515 are considered as prominent system events. The prominent system events may include those system events listed in the system log 205 that are indicative/predicative of the similarity of system data (indicative metadata) and relevant for more efficiently grouping and compressing system logs. For example, prominent system events may include any system event that triggered generation of the system log 205, significant errors (e.g., operating system crash, storage device failure, etc.), a significant configuration event (e.g., addition of a new storage device, disk shelf, or storage node).

The prominent system configuration information may comprise prominent software or hardware component information. The prominent system configuration information may comprise a sub-set of the system configuration information 520 included in system data 510, whereby only a predetermined few of the system configuration information 520 are considered as prominent system events. The prominent system configuration information may include those system configuration information listed in the system log 205 that are indicative/predicative of the similarity of system data (indicative metadata) and relevant for more efficiently grouping and compressing system logs. For example, prominent system configuration information may include operating system type and version, processor model and version, or storage device model.

As described above, the system data 510 of a system log 205 may describe elements of a computer system and are relevant for computer system support purposes. The system log metadata 550 of a system log 205 may comprise indicative metadata relevant for more efficiently grouping and compressing the system logs 205. For example, the system log metadata 550 may describe particular elements of the system log 205 itself (e.g., time the system log was generated) or a predetermined sub-set of data of the system data (comprising prominent system data) relevant for more efficiently grouping and compressing the system logs.

The method 400 then stores (at 425) the metadata fields 555 of the system log metadata 550 to the system log 205. The method 400 may integrate the system log metadata 550 into the system log 205. For example, the system log metadata 550 may be stored to a predetermined section of the system log 205, such as the header section of the system log 205 (as shown in the example of FIG. 5). In some embodiments, the metadata fields 555 are stored and listed in the system log 205 (e.g., in the header section) in a predetermined order (so that corresponding metadata fields 555 in different system logs 205 may be compared by the system log grouping module 215). As such, the system log metadata 550 may be specially formatted so that each metadata field 555 is located in a predetermined order or position in the system log 205 to allow easy comparison of corresponding metadata fields 555 of different system logs 205. For example, in the header section of each system log 205, the time the system log 205 was generated may be stored/listed in a first position, prominent system events stored/listed in a second position, the identifier for the computer system 200 stored/listed in a third position, etc.

In some embodiments, at least two computer systems 200 may be connected through a network, each computer system 200 producing its own system logs 205. In these embodiments, the system logs 205 of a computer system 200 may be transmitted and stored to a central storage location ("central repository"). In these embodiments, as an optional step, the method 400 may send (at 430) the system log 205 (through the network) to the central repository (comprising, for example, another computer system 200). The method 400 then ends. The method 400 may be repeated to produce and send multiple system logs 205. For example, the method may be repeated periodically or upon occurrence of predetermined system events (which initiates the method 400.

III. Grouping and Compressing System Logs Based on System Log Metadata

In some embodiments, the system log grouping module 215 may be configured to group and compress system logs 205 based on the system log metadata 550 of the system logs 205. The system log grouping module 215 may reside and execute on each computer system 200 for grouping and processing system logs of the computer system 200. In other embodiments, the system log grouping module 215 may reside and execute on a computer system 200 acting as a central repository storing system logs 205 of two or more computer system 200, the system log grouping module 215 for grouping and processing system logs of the two or more computer systems 200.

By grouping and compressing system logs 205 based on the system log metadata 550, a higher degree of compression may be achieved. This is since the degree of compression is typically dependent on the amount of redundancy in the data to be compressed. System logs 205 having the same or similar system log metadata 550 are more likely to also have similar system data 510, thus allowing a higher degree of compression when grouping and then compressing system logs 205 having the same or similar system log metadata 550. For example, two system logs 205 on a computer system 200 that were produced within 10 minutes of each other may be considered to have similar values for the "system log generation time" metadata field 555. Since the two system logs 205 were produced within 10 minutes of each other, they are also likely to have similar system data 510 as few, if any, system changes may have occurred within the 10 minutes. As such, grouping and compressing the two system logs 205 may produce a high degree of compression. A grouping of two or more system logs 205 having the same or similar system log metadata 550 may be compressed (as a single unit/data container) using conventional compression programs or tools known in the art.

Figure 6:
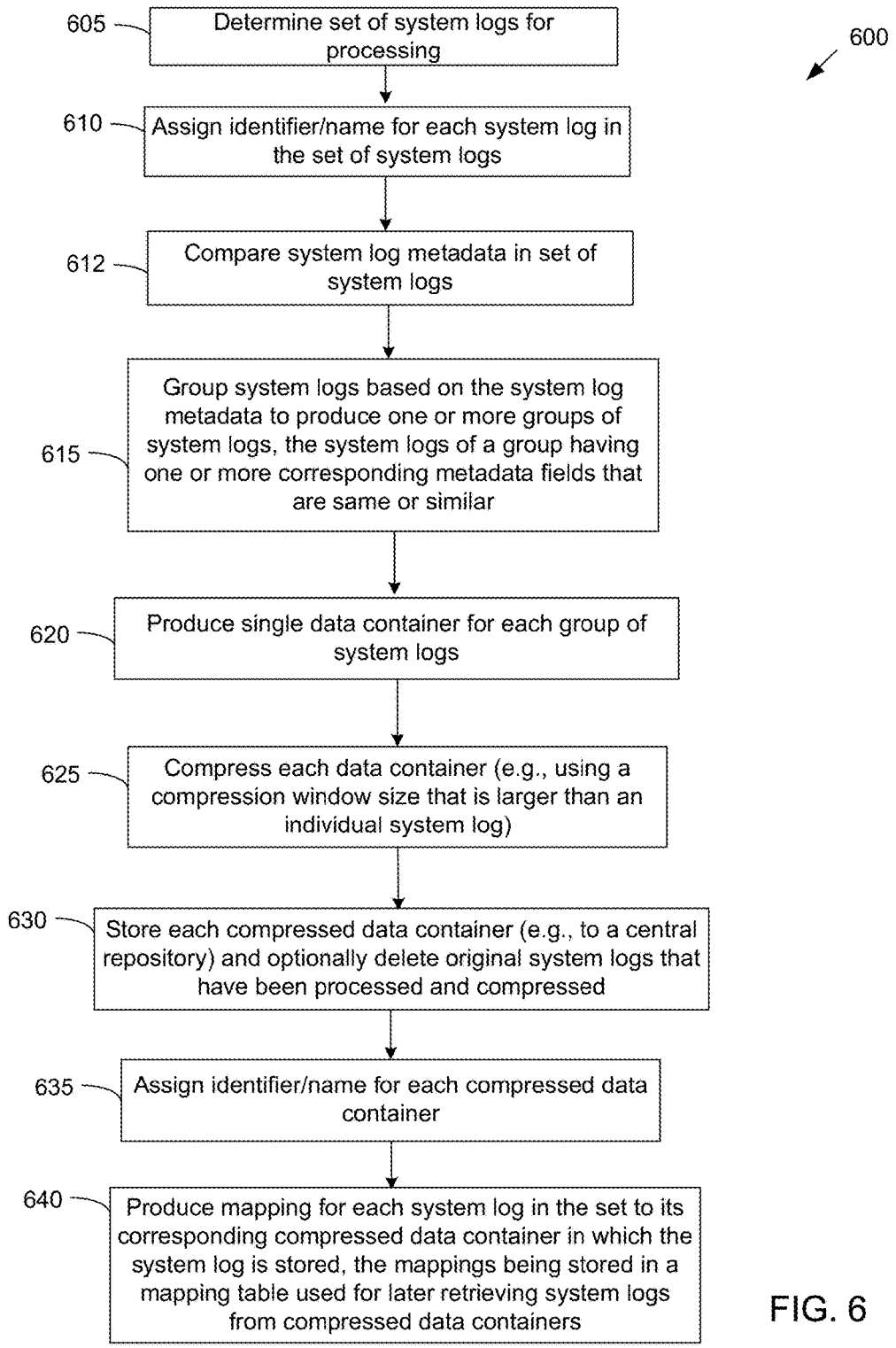
FIG. 6 is a flowchart of a method for grouping and compressing system logs based on system log metadata, in accordance with some embodiments.

FIG. 6 is a flowchart of a method 600 for grouping and compressing system logs based on system log metadata, in accordance with some embodiments. The method 600 of FIG. 6 is described in relation to FIGS. 7 and 8. The order and number of steps of the method 600 are for illustrative purposes only and, in other embodiments, a different order and/or number of steps are used. For illustrative purposes, a data container is described below as a file. In other embodiments, however, the data container may comprise another type of data container or data structure for storing data. In some embodiments, some of the steps of the method 600 are performed or caused to be performed by a system log grouping module 215 executing on a computer system 200 (e.g., server 110 or storage system 120). The system log grouping module 215 may operate in conjunction with the operating system 225 to perform embodiments described herein.

The method 600 begins by determining (at 605) a set of two or more system logs 205 for processing. For example, the set of system logs 205 may comprise the system logs from a single local computer system 200 or from two or more different computer systems 200 (the system logs of a remote computer system 200 being received through a network). The set of system logs 205 may be stored, for example, on the local storage 290. For example, the method 600 may determine a set of 200 system logs 205 for processing, thus processing the system logs in batches of 200.

The method 600 then assigns (at 610) a unique identifier/name for each system log in the set of system logs. In some embodiments, the identifier for a system log may comprise a particular metadata field 555 in the system log (e.g., the time the system log 205 was generated, etc.). In other embodiments, the identifier may comprise a combination of two or more particular metadata fields 555 in a system log (e.g., the time the system log 205 was generated in combination with an identifier for the computer system 200 that generated the system log 205, etc.). As another example, the identifier for a system log may comprise the time the system log was received through the network. As a further example, the identifier for a system log may comprise a sequence order the system log was received through the network.

The method 600 then compares (at 612) the system log metadata of the set of system logs. The method 600 may do so by comparing one or more corresponding metadata fields 555 in the system logs 205 in their corresponding positions to determine whether the corresponding values are the same or similar. As described above, the metadata fields 555 may be specially formatted so that each metadata field 555 is located in a predetermined order and position in the system logs 205 to allow easy comparison of corresponding metadata fields 555 of different system logs 205. As such, the method 600 may compare metadata fields in different system logs by comparing values in the metadata fields 555 in the corresponding positions in the system logs. For example, for comparing a particular metadata field 555 (e.g., computer system identifier) listed in a third metadata field position, the method 600 may compare the values in the corresponding position (e.g., third metadata field position) of different system logs to determine if the values are the same or similar.

The method 600 then groups (at 615) system logs in the set of system logs based on the system log metadata of the system logs, thereby producing one or more groups of system logs within the set of system logs. Each group of system logs may comprise two or more system logs having the same or similar system log metadata, whereby one or more corresponding metadata fields 555 are the same or similar in value.

The method 600 may do so by grouping system logs having one or more corresponding metadata fields that are the same in value. For example, the method may compare two metadata fields in the system logs (e.g., the metadata fields comprising the computer system identifier and the operating system type and version), and group together only those system logs having the same values for both metadata fields (e.g., whereby each system log in a group has the same computer system identifier and the same operating system type and version).

In other embodiments, the method 600 may do so by grouping system logs having one or more corresponding metadata fields that are similar in value. For example, the method may compare two metadata fields in the system logs (e.g., the metadata fields comprising the system log generation time and the operating system type and version), and group together only those system logs having similar values for both metadata fields (e.g., whereby each system log in a group has similar system log generation times and similar operating system type and versions). For example, operating system versions 7.1 and 7.2 may be considered similar for grouping, whereas version 8.0 may be considered not similar for grouping.

Figure 7:
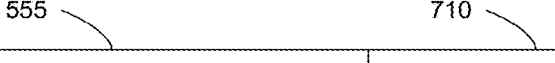
FIG. 7 conceptually illustrates the contents of an exemplary metadata similarity data structure.

The method 600 may determine which values are "similar" for particular metadata fields 555 using the metadata similarity data structure 228 that specifies values considered similar for particular metadata fields 555. FIG. 7 conceptually illustrates the contents of an exemplary metadata similarity data structure 228. As shown in example of FIG. 7, the metadata similarity data structure 228 comprises entries for metadata fields 555 and values considered similar ("Similar Values" 710) for each metadata field 555 entry. Similar values 710 for a metadata field 555 may be specified in various ways (e.g., through a specific listing of values considered similar, through a range of values considered similar, etc.).

For example, for the metadata field 555 comprising the system log generation time, a range of generation times within 10 minutes of each other may be considered similar for grouping. For example, for the metadata field 555 comprising prominent system events in the system log, a specific listing of system events considered similar for grouping may be specified (e.g., "storage device failure" and "storage device error" may be considered similar; "storage device update" and "addition of new storage device" may be considered similar; "operating system crash" and "operating system reboot" may be considered similar; "disk shelf firmware upgrade" and "addition of new disk shelf" may be considered similar, etc.). For example, for the metadata field 555 comprising the operating system type and version, a specific listing of operating system type and versions considered similar for grouping may be specified (e.g., Windows® MS Versions 5.0 and 5.1 are considered similar, Data ONTAP® Versions 7.1 and 7.2 are considered similar, etc.).

The number of metadata fields 555 and which particular metadata fields 555 are compared to produce the groupings may vary and be based, for example, on testing data showing which metadata fields 555 or combination of metadata fields 555 typically produce the greatest degree of compression. Although, as described above, the metadata fields 555 may comprise indicative metadata that are indicative/predicative of the similarity of system data and provide a relatively higher degree of compression, the number and combination of metadata fields 555 that are compared to produce the groupings may be varied. The desire for a greater degree of compression may be balanced by the amount of time required to compare multiple metadata fields 555 (whereby comparing fewer metadata fields 555 may produce lower compression ratios but provide faster grouping of system logs 205). These factors may be considered when selecting the number of metadata fields 555 and which particular metadata fields 555 are compared to produce the system log groupings.

Figure 8:
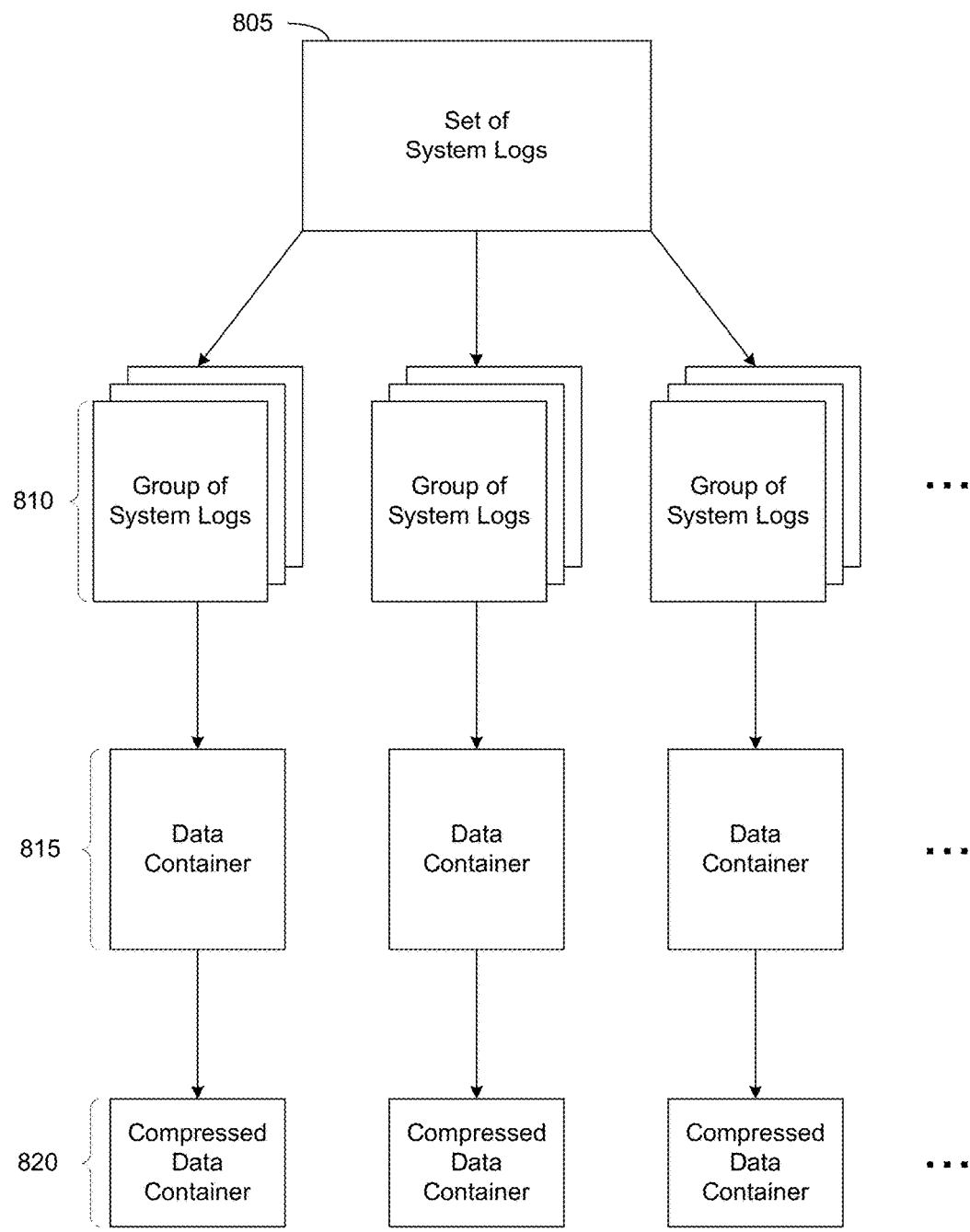
FIG. 8 conceptually illustrates exemplary steps of the method of FIG. 6.

FIG. 8 conceptually illustrates exemplary steps of the method 600 of FIG. 6. As shown in the example of FIG. 8, the method 600 determines (at 605) a set of system logs 805 for processing, each system log having an assigned identifier/name. The method 600 then groups (at 615) system logs in the set of system logs 805 based on the system log metadata of the system logs, thereby producing one or more groups of system logs 810 within the set of system logs 80, each system log in the same group 810 having one or more corresponding metadata fields 555 that are the same or similar in value.

The method 600 then produces (at 620) a single data container for each group of system logs 810, the single data container storing/containing the data for each system log in the group 810. For example, the method 600 may store the data of each system log of a group 810 to a single data container by concatenating data contents of each system log sequentially into the single data container. For example, the method 600 may store the data of each system log in a group 810 to a single file. In some embodiments, the data container includes system log metadata of the system logs. In other embodiments, the data container does not include system log metadata of the system logs. As shown in the example of FIG. 8, a single data container 815 is formed from and produced for each group of system logs 810.

The method 600 then compresses (at 625) each data container. As shown in the example of FIG. 8, each data container 815 is compressed to produce a compressed data container 820. The method may do so using conventional compression programs or tools. As known in the art, compression programs or tools may examine sections of "original data" in a data container and determine repeating elements in the original data, and replace the repeating elements with smaller data symbols that identify the original text but has less data storage size than the original data. For example, the method may compress original data "AAAAABAAAAACAAAAAD," to "aBaCaD"+ "a=AAAAA" (where "a" comprise a smaller data symbol). As such, the degree of compression attainable is typically dependent on the number of repeating elements in the original data.

Also, as known in the art, the degree of compression attainable may also be dependent on the size of the compression window used by the compression program or tool. The compression window size determines the amount of original data examined and considered for compression. As such, the larger the compression window size, typically the higher the degree of compression that is attainable (since there is likely to be more repeating elements in larger window sizes). In some embodiments, the method 600 uses a compression program or tool having a compression window size that is larger than a data storage size of an individual system log. By grouping system logs based on the system log metadata, system logs having similar data may be grouped for compression. A compression window size that is significantly larger than an individual system log may leverage this advantage and provide greater compression. In some embodiments, a compression window size of at least 1.5 times greater than a data storage size of a "typical" individual system log is used. For example, the data storage size of a "typical" individual system log may comprise an average or median data storage size that is determined by examining the system logs.

The method 600 may produce (at 620) a single data container for each group of system logs 810 and compress (at 625) each data container using conventional programs or tools (e.g., gzip, bzip2, rzip, etc.). Note that some conventional programs may do so as separate steps or as one step. For example, conventional programs such as archiving programs (e.g., 7-Zip, TAR, etc.) may produce a single data container comprising a single archive file (comprising a group of system logs 810) and compress the single archive file in a single step.

The method 600 stores (at 630) each compressed data container 820. For example, the compressed data containers 820 may be stored to local storage 290 (as shown in FIG. 2). In some embodiments, the local storage 290 may act as a central repository for two or more computer systems 200. Optionally, the method may also delete (e.g., from local storage 290) any original system logs 205 that have been processed and compressed by the method 600 in the above steps. In other embodiments, however, the original system logs 205 may be retained whereby the compressed data containers 820 may be used as a secondary backup copy to the original system logs 205.

The method 600 assigns (at 635) a unique identifier/name for each compressed data container 815. For example, "DataContainerX" may store data of system logs "A," "F," "G," and "L." The method 600 then produces (at 640) a mapping for each system log (in the set of system logs) to its corresponding compressed data container in which the system log is stored. For example, a mapping for a system log may comprise an identifier of the system log (e.g., "A") and the identifier of the corresponding data container (e.g., "DataContainerX") in which the system log is stored. A mapping may also include the storage address of the corresponding data container that indicates the storage location of the corresponding data container (e.g., stored in local storage 290). The mappings may be stored, for example, in a mapping table 850 stored, for example, in local storage 290 (as shown in FIG. 2).

The mapping table 850 may be used, for example, to later retrieve requested system logs. When a particular system log 205 is to be retrieved from a particular compressed data container 820 (the identifier of such being determined using the mapping table 850), the particular compressed data container 820 needs to be decompressed/extracted to reconstruct the data of the system log 820 in its original uncompressed form. Decompression of a compressed data container 820 may be performed using conventional decompression programs or tools (typically corresponding to the compression program or tool that compressed the data container initially). The original uncompressed system log 820 may then be retrieved and returned. The method 600 may be repeated as new system logs 205 are generated and received for grouping and compression.

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would further understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A computing device comprising:
a memory containing a computer readable medium comprising instructions for performing a method; and
a processor coupled to the memory, the processor configured to execute the instructions to cause the processor to:
compare an amount of compression that is to be provided for compressing logs to an amount of time to compare metadata fields to determine a number of metadata fields within first metadata of a first log and second metadata of a second log to compare for calculating a degree of similarity of the first log and the second log;
extract the number of metadata fields from the first metadata as a first subset of metadata fields and from the second metadata as a second subset of metadata fields;
identify a list of similarity values, from a metadata similarity data structure, considered to be similar for each type of metadata field extracted from the first metadata and the second metadata;
for each type of metadata field extracted from the first metadata and the second metadata, compare values of the first subset of metadata fields with values of the second subset of metadata fields against the list of similarity values to determine corresponding metadata fields that are similar in value; and
group and compress the first log and the second log according to the degree of compression based upon the corresponding metadata fields similar in value.

2. The computing device of claim 1, wherein the instructions cause the processor to:
for each metadata field, evaluate testing data to determine a degree of compression expected to be achieved when utilizing a metadata field to determine similarity between logs.

3. The computing device of claim 1, wherein the instructions cause the processor to:
for each combination of multiple metadata fields, evaluate testing data to determine a degree of compression expected to be achieved when utilizing a combination of multiple metadata fields to determine similarity between logs.

4. The computing device of claim 1, wherein the instructions cause the processor to:
determine the number of metadata fields based upon a first set of factors and a second set of factors, wherein the first set of factors is constructed by evaluating testing data to construct the first set of factors corresponding to degrees of compression expected to be achieved when utilizing metadata fields and combination of multiple metadata fields for determining similarity between logs, and wherein the second set of factors is constructed to correspond to amounts of time to group logs utilizing varying numbers of metadata fields for determining similarity between logs.

5. The computing device of claim 1, wherein the instructions cause the processor to:
select a compression window size that is larger than an average data storage size of logs, wherein the compression window size is used to compress the first log and the second log according to the degree of compression.

6. A non-transitory computer readable medium having instructions stored thereon, which when executed by a processor, cause the processor to:
compare an amount of compression that is to be provided for compressing logs to an amount of time to compare metadata fields to determine a number of metadata fields within first metadata of a first log and second metadata of a second log to compare for calculating a degree of similarity of the first log and the second log;
extract the number of metadata fields from the first metadata as a first subset of metadata fields and from the second metadata as a second subset of metadata fields;
identify a list of similarity values, from a metadata similarity data structure, considered to be similar for each type of metadata field extracted from the first metadata and the second metadata;
for each type of metadata field extracted from the first metadata and the second metadata, compare values of the first subset of metadata fields with values of the second subset of metadata fields against the list of similarity values to determine corresponding metadata fields that are similar in value; and
group and compress the first log and the second log according to the degree of compression based upon the corresponding metadata fields similar in value.

7. The non-transitory computer readable medium of claim 6, wherein the instructions cause the processor to:
for each metadata field, evaluate testing data to determine a degree of compression expected to be achieved when utilizing a metadata field to determine similarity between logs.

8. The non-transitory computer readable medium of claim 6, wherein the instructions cause the processor to:
for each combination of multiple metadata fields, evaluate testing data to determine a degree of compression expected to be achieved when utilizing a combination of multiple metadata fields to determine similarity between logs.

9. The non-transitory computer readable medium of claim 6, wherein the instructions cause the processor to:

determine the number of metadata fields based upon a first set of factors and a second set of factors, wherein the first set of factors is constructed by evaluating testing data to construct the first set of factors corresponding to degrees of compression expected to be achieved when utilizing metadata fields and combination of multiple metadata fields for determining similarity between logs, and wherein the second set of factors is constructed to correspond to amounts of time to group logs utilizing varying numbers of metadata fields for determining similarity between logs.

10. The non-transitory computer readable medium of claim 6, wherein the first metadata is stored within a header of the first log.

11. A method comprising:

comparing an amount of compression that is to be provided for compressing logs to an amount of time to compare metadata fields to determine a number of metadata fields within first metadata of a first log and second metadata of a second log to compare for calculating a degree of similarity of the first log and the second log;

extracting the number of metadata fields from the first metadata as a first subset of metadata fields and from the second metadata as a second subset of metadata fields;

identifying a list of similarity values, from a metadata similarity data structure, considered to be similar for each type of metadata field extracted from the first metadata and the second metadata;

for each type of metadata field extracted from the first metadata and the second metadata, comparing values of the first subset of metadata fields with values of the second subset of metadata fields against the list of similarity values to determine corresponding metadata fields that are similar in value; and grouping and compressing the first log and the second log according to the degree of compression based upon the corresponding metadata fields similar in value.

12. The method of claim 11, comprising:

generating a mapping table that maps the first log and the second log to a compressed data container within which the first log and the second log are compressed.

13. The method of claim 11, comprising:

for each metadata field, evaluating testing data to determine a degree of compression expected to be achieved when utilizing a metadata field to determine similarity between logs.

14. The method of claim 11, wherein metadata fields of the first metadata and metadata fields of the second metadata are stored in a predetermined order.

15. The method of claim 11, comprising:

determining the number of metadata fields based upon a first set of factors and a second set of factors, wherein the first set of factors is constructed by evaluating testing data to construct the first set of factors corresponding to degrees of compression expected to be achieved when utilizing metadata fields and combination of multiple metadata fields for determining similarity between logs, and wherein the second set of factors is constructed to correspond to amounts of time to group logs utilizing varying numbers of metadata fields for determining similarity between logs.

* * * * *